(12) United States Patent
Deguchi et al.

(10) Patent No.: US 9,030,180 B2
(45) Date of Patent: May 12, 2015

(54) SWITCHING REGULATOR

(75) Inventors: Michiyasu Deguchi, Chiba (JP); Kenji Yoshida, Chiba (JP)

(73) Assignee: Seiko Instruments Inc., Chiba (JP)

( * ) Notice: Subject to any disclaimer, the term of this patent is extended or adjusted under 35 U.S.C. 154(b) by 260 days.

(21) Appl. No.: 13/486,531

(22) Filed: Jun. 1, 2012

(65) Prior Publication Data

US 2012/0313601 A1 Dec. 13, 2012

(30) Foreign Application Priority Data

Jun. 9, 2011 (JP) ................................. 2011-129399

(51) Int. Cl.
| | |
|---|---|
| *G05F 1/00* | (2006.01) |
| *H02M 3/156* | (2006.01) |
| *H02M 1/00* | (2006.01) |

(52) U.S. Cl.
CPC ...... *H02M 3/156* (2013.01); *H02M 2001/0035* (2013.01); *Y02B 70/16* (2013.01)

(58) Field of Classification Search
CPC ........... H02M 3/156–3/158; H02M 2001/0035
USPC ................. 323/282–285, 271, 220, 234, 238, 323/311–312
See application file for complete search history.

(56) References Cited

U.S. PATENT DOCUMENTS

| | | | |
|---|---|---|---|
| 6,100,675 A | 8/2000 | Sudo | |
| 6,448,752 B1 * | 9/2002 | Umemoto | 323/288 |
| 7,663,356 B2 * | 2/2010 | Inatomi | 323/283 |
| 7,679,348 B2 * | 3/2010 | Sohma | 323/282 |
| 8,242,764 B2 * | 8/2012 | Shimizu et al. | 323/285 |
| 2006/0038547 A1 * | 2/2006 | Ahmad | 323/284 |
| 2007/0069707 A1 * | 3/2007 | Miyashita et al. | 323/284 |
| 2009/0322299 A1 * | 12/2009 | Michishita et al. | 323/282 |
| 2012/0025799 A1 * | 2/2012 | Tournatory et al. | 323/285 |

FOREIGN PATENT DOCUMENTS

JP 2005057954 * 3/2005

* cited by examiner

*Primary Examiner* — Timothy J Dole
*Assistant Examiner* — Shahzeb K Ahmad
(74) *Attorney, Agent, or Firm* — Brinks Gilson & Lione

(57) ABSTRACT

In order to provide a switching regulator having high efficiency even under light load, the switching regulator is configured so that ON/OFF of a switching element is controlled by an output signal of an oscillation circuit having an oscillation frequency controlled by an output signal from an error amplifier. Thereby, the oscillation frequency can be suppressed under light load, thus reducing a switching loss.

2 Claims, 4 Drawing Sheets

SWITCHING REGULATOR

RELATED APPLICATIONS

This application claims priority under 35 U.S.C. §119 to Japanese Patent Application No. 2011-129399 filed on Jun. 9, 2011, the entire content of which is hereby incorporated by reference.

BACKGROUND OF THE INVENTION

1. Field of the Invention

The present invention relates to switching regulators capable of increasing the efficiency under light load.

2. Description of the Related Art

Switching regulators are used as a voltage supply source for various electronic device circuits. One of functions of switching regulators is to output a constant voltage through an output terminal with high conversion efficiency irrespective of voltage fluctuation at an input terminal. It is also important for switching regulators to maintain high conversion efficiency even when an electronic device as a load enters a low power consumption mode such as a stand-by state so that current supplied from the output terminal to the load decreases.

FIG. 4 is a circuit diagram of a conventional step-up switching regulator.

An input power supply 20 is connected to a coil 22. A rectifying device 23 is connected between the coil 22 and an output capacity 24. A load 25 is connected in parallel with the output capacity 24. A switching regulator control circuit 200 controls ON and OFF of a switching element 21 of a switching regulator.

The output from an error amplifier 13 is voltage Verr, the output from a reference voltage circuit 10 is reference voltage Vref, voltage at a connection between bleeders 11 and 12 is divided voltage Vfb. When Vref>Vfb, the voltage Verr becomes high, and conversely when Vref<Vfb, the voltage Verr becomes low. A PWM comparator 14 compares the output Vramp (e.g., triangle wave) from an oscillation circuit 15 with the voltage Verr and outputs a signal. FIG. 5 illustrates a relationship among these signals. That is, increase/decrease of the voltage Verr output from the error amplifier 13 controls a pulse width of an output signal Vpwm of the PWM comparator 14. This is so-called PWM control by a switching regulator.

Generally longer ON duration of a switching element allows a switching regulator to feed much power to a load. For instance, larger load current Iout decreases the output voltage from the switching regulator, thus decreasing the divided voltage Vfb. This causes the voltage Verr to increase, thus widening the output pulse width of the PWM comparator 14, and the pulse width is controlled so that the output voltage Vout can be kept constant. Conversely, smaller load current Iout increases the output voltage from the switching regulator, thus increasing the divide voltage Vfb. This causes the voltage Verr to decrease, thus narrowing the output pulse width of the PWM comparator 14, and the pulse width is controlled so that the output voltage Vout can be kept constant. In this way, the voltage Verr output from the error amplifier 13 changes with the load current value, thus controlling the pulse width of the switching regulator.

The aforementioned PWM control, however, has a drawback that smaller load current Iout (hereinafter called light load) degrades the efficiency extremely. This is because the amount of energy necessary to turn ON/OFF of a switching element increases with reference to the supply energy to the output. It is widely known that average current I flowing during repeated charge and discharge at a frequency of f [Hz] from 0 [V] to V [V] satisfies I=CVf [A]. That is, let that the input capacity of the switching element 21 is Cin [F], the voltage of the input power supply 20 is Vin [V] and the switching regulator operates at the frequency of Fosc [Hz], a current value Iop necessary to drive the switching element 21 will be Iop=Cin×Vin×Fosc.

As one example, in the case of typical numerical values such as Cin=500 pF, Vin=5 V and Fosc=1 MHz, Iop will be 2.5 mA and power loss Pin on the input power supply side will be Pin=Vin×Iop=12.5 mW. At this time, when the output voltage Vout is 10 V and the load current Iout is 1 mA, the supply power Pout to the output side will be Pout=Iout×Vout=10 mW. Accordingly, just power necessary to drive the switching element 21 exceeds the supply power to the output. Actually flow-through current of a buffer circuit and the like also flows to drive the switching element, and therefore loss involved in the driving of the switching element becomes a much larger value.

Such losses involved in the driving of the switching element, however, have a property of increasing with an operating frequency of the switching regulator, and therefore conventionally a technique to lower the operating frequency thereof under light load has been widely used, thus reducing a driving loss of the switching element 21. As mentioned before, since the voltage Verr varies with the load current, thereby controlling the output voltage Vout, output load detection means can be configured by monitoring the voltage Verr. Based on this, a load detection circuit 100 of FIG. 4 is configured. The load detection circuit 100 is made up of transistors 110 and 111. As the voltage Verr of the error amplifier 13 increases, gate voltage of the Nch transistor 110 increases, and therefore current Iosc1 between drain and source thereof increases. Since the transistor 111 and a transistor 112 have a current relationship, current Iosc2 between drain and source of the transistor 112 also increases in proportion to the current Iosc1. The current Iosc2 is bias current of the oscillation circuit 15, and when the oscillation circuit 15 is configured so as to oscillate using time to charge the capacity with the current Iosc2, for example, the oscillation frequency changes depending on the current Iosc2.

For example, when the load current Iout becomes large and the output voltage Vout decreases, the voltage Verr increases. As a result, the current Iosc1 and the current Iosc2 increase. Therefore the oscillation circuit 15 oscillates at a high frequency. Conversely in the case of light load, the voltage Verr decreases and the current Iosc2 reduces, and therefore the oscillation frequency decreases, so that the frequency of ON/OFF of the switching element reduces. As a result, driving loss reduces, whereby efficiency under light load can be improved (see Patent Document 1, for example).

[Patent Document 1] Japanese Patent Application Laid-Open No. 11 (1999)-155281

SUMMARY OF THE INVENTION

The aforementioned conventional switching regulator, however, has the drawback that the oscillation frequency changes irrespective of the load current Iout when the output voltage Vout is set low. In the case of the PWM control, the output voltage is decided by ON duty of the switching element. In the case of the step-up switching regulator of FIG. 4, the theoretical formula of ON duty in a current continuous mode is Duty=1−Vin/Vout. That is, the ON duty is the ratio of the voltage Verr with reference to the amplitude of the triangle wave Vramp, and lower voltage Verr means small ON duty.

Since lower voltage Verr accordingly means smaller current Iosc1, resulting in a lower oscillation frequency. Since an increase in load current Tout leads to a slight change of Duty, the oscillation frequency remains low. Accordingly, the energy feeding frequency to the output voltage Vout reduces. That is, energy feeding cycle becomes long, during which discharging of the output voltage Vout proceeds, thus causing a problem of an increase in ripple voltage of the output voltage Vout.

The present invention is devised to cope with the aforementioned problems, and it is an object of the present invention to provide a switching regulator having an oscillation frequency changing with load current Tout, thus improving the efficiency under light load and reducing ripple voltage under heavy load.

In order to cope with the conventional problems, a switching regulator of the present invention is configured as follows:

(1) a switching regulator includes: an error amplifier that amplifies a difference between divided voltage and reference voltage, the divided voltage being obtained by dividing output voltage, and outputs the amplified difference; an oscillation circuit that outputs a rectangular wave in accordance with an output signal from the error amplifier; and a switching element, ON/OFF of the switching element being controlled on a basis of an output signal from the oscillation circuit. An oscillation frequency of the oscillation circuit can change with the output signal from the error amplifier; and (2) a switching regulator in another aspect includes: an error amplifier that amplifies a difference between divided voltage and reference voltage, the divided voltage being obtained by dividing output voltage, and outputs the amplified difference; an oscillation circuit that outputs a rectangular wave in accordance with an output signal from the error amplifier; and a switching element, ON/OFF of the switching element being controlled on a basis of an output signal from the oscillation circuit. The oscillation circuit includes: a constant current source that feeds constant current; a capacity that is charged with the constant current of the constant current source; a comparator that compares voltage of the capacity with reference voltage and outputs a rectangular wave; and a transistor circuit that controls charge/discharge of the capacity in accordance with an output signal from the comparator and the output signal from the error amplifier. An oscillation frequency can change with the output signal from the error amplifier.

According to the switching regulators of the present invention, a switching operation is performed at an optimum frequency in accordance with the load current Tout, and therefore the driving loss of the switching element 21 reduces. Therefore boosting efficiency under light load can be improved. Further even when the output voltage Vout is set low, the switching frequency is not fixed at a low state. Accordingly, ripple voltage can be suppressed.

DETAILED DESCRIPTION OF THE PREFERRED EMBODIMENTS

Figure 1:
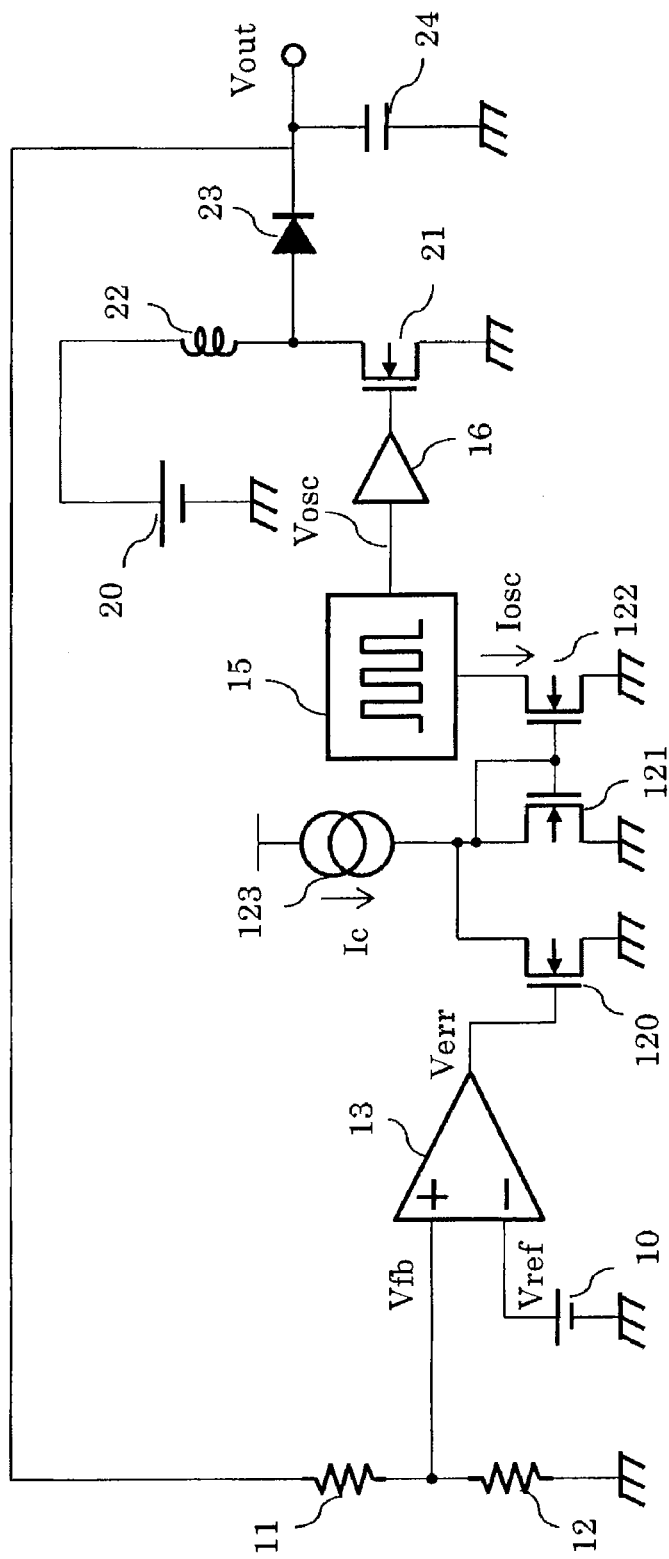
FIG. 1 is a circuit diagram of a switching regulator that is Embodiment 1.

FIG. 1 is a circuit diagram of a switching regulator that is Embodiment 1.

The switching regulator of Embodiment 1 includes: output voltage division resistances 11 and 12; a reference voltage circuit 10; an error amplifier 13; an oscillation circuit 15; a buffer circuit 16; a switching element 21; a coil 22; a diode 23; an output capacity 24; a constant current source 123 and transistors 120, 121 and 122. The constant current source 123 feeds constant current Ic. The oscillation frequency of the oscillation circuit 15 is controlled based on fed bias current Iosc.

The output voltage division resistances 11 and 12 divide the output voltage Vout and output divided voltage Vfb. The error amplifier 13 compares the divided voltage Vfb with the reference voltage Vref that is output from the reference voltage circuit 10 and amplifies a different voltage thereof to output the same as voltage Verr. Since the divided voltage Vfb is input to a non-inverting input of the error amplifier 13 and the reference voltage Vref is input to an inverting input thereof, when the output voltage Vout is lower than a set value, the voltage Verr of the error amplifier 13 becomes low, and when the output voltage Vout is higher than the set value, the voltage Verr becomes high. The voltage Verr output from the error amplifier 13 is input to gate of the transistor 120.

Herein, when the voltage Verr is equal to the threshold voltage of the transistor 120 or lower, the transistor 120 becomes OFF, so that the constant current Ic of the constant current source 123 flows through the transistor 121. At this time, the bias current Iosc fed to the oscillation circuit 15 becomes the maximum and the oscillation frequency becomes the highest.

When the voltage Verr becomes high, driving ability of the transistor 120 increases so that current starts to flow through the transistor 120. As a result, current flowing into the transistor 121 decreases and the bias current Iosc fed to the oscillation circuit 15 also decreases, and therefore the oscillation frequency becomes low. Accordingly, the oscillation frequency of the oscillation circuit 15 is controlled by the voltage Verr, and when the voltage Verr falls below the threshold voltage of the transistor 120, the oscillation frequency reaches the maximum oscillation frequency.

An oscillation signal Vosc as a rectangular wave that is output from the oscillation circuit 15 undergoes power amplification by the buffer circuit 16 and is input to gate of the switching element 21. Energy charged at the coil 22 during ON-duration of the switching element 21 is fed to the output capacity 24 via the diode 23 during OFF-duration of the switching element 21. In this way, the switching element 21 turns ON/OFF, and so the switching regulator performs a boost operation.

An increase in the load current Tout means lowering of the voltage Verr, and therefore the oscillation frequency of the oscillation circuit 15 becomes high. Accordingly, energy supply frequency to the output capacity 24 per unit time increases. Conversely a decrease in the load current Tout means rising of the voltage Verr, and therefore the oscillation frequency of the oscillation circuit 15 becomes low. Accordingly energy supply frequency to the output capacity 24 per unit time decreases.

As described above, the switching regulator of Embodiment 1 performs a switching operation at an optimum frequency in accordance with the load current Tout, and therefore driving loss of the switching element 21 reduces. As a result, boosting efficiency under light load can be improved.

Further since the oscillation signal VOSC output from the oscillation circuit 15 is a rectangular wave, a PWM comparator is not required. In general a PWM comparator has consumption current of a few uA to a few tens uA, which is an extremely large loss under light load where the output load current Tout is several uA. Accordingly such a configuration is considerably effective for the efficiency improvement under light load.

Even when the output voltage Vout is set low, the switching frequency is not fixed at a low state. Accordingly, ripple voltage of the output voltage Vout can be suppressed.

Figure 2:
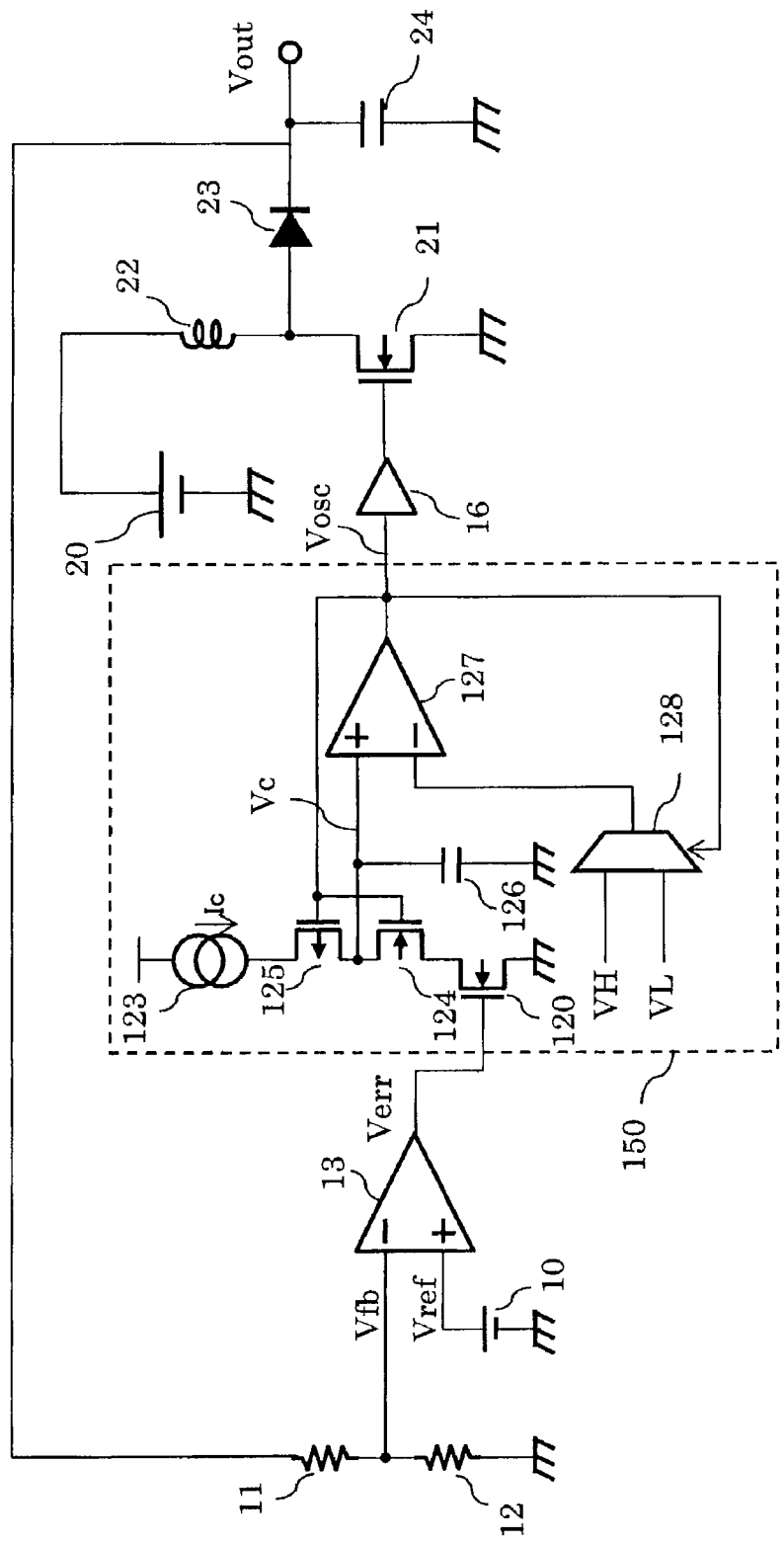
FIG. 2 is a circuit diagram of a switching regulator that is Embodiment 2.

FIG. 2 is a circuit diagram of a switching regulator that is Embodiment 2.

The switching regulator of Embodiment 2 includes: output voltage division resistances 11 and 12; a reference voltage circuit 10; an oscillation circuit 150; a buffer circuit 16; a switching element 21; a coil 22; a diode 23 and an output capacity 24. The oscillation circuit 150 includes a comparator 127; a capacity 126; a constant current source 123; charge/discharge control elements 120, 124 and 125 and a multiplexer 128.

The error amplifier 13 has an inverting input terminal that receives the divided voltage Vfb as an input, a non-inverting input terminal that receives the reference voltage Vref as an input and an output terminal connected to the charge/discharge control element 120. The constant current source 123 and the charge/discharge control elements 125, 124 and 120 are connected in series between a power supply and ground. The multiplexer 128 receives reference voltage VL and reference voltage VH as input. The reference voltage VL and the reference voltage VH are set so that the reference voltage VH>the reference voltage VL. The comparator 127 has an inverting input terminal to which the output terminal of the multiplexer 128 is connected, a non-inverting input terminal to which a connection point between the charge/discharge control elements 125 and 124 as well as the capacity 126 are connected and an output terminal to which the charge/discharge control elements 125 and 124, the multiplexer 128 and the buffer circuit 16 are connected.

Referring now to the following drawing, an operation of the circuit of the switching regulator of Embodiment 2 is described below.

Figure 3:
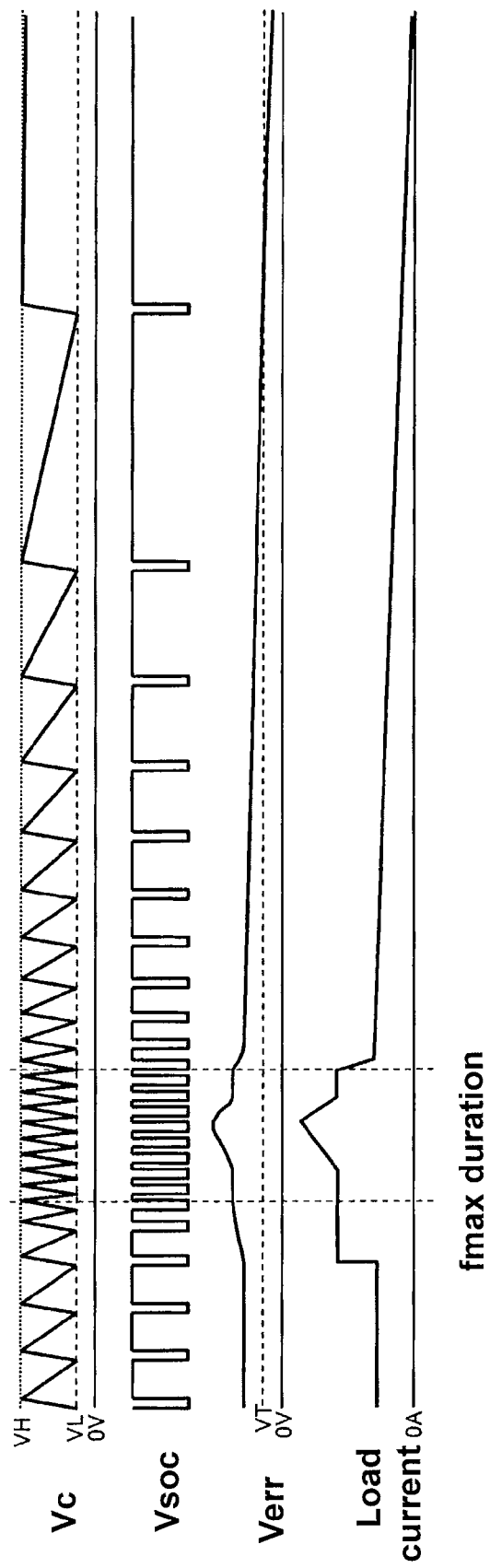
FIG. 3 is a timing chart of the switching regulator of Embodiment 2.
Figure 4:
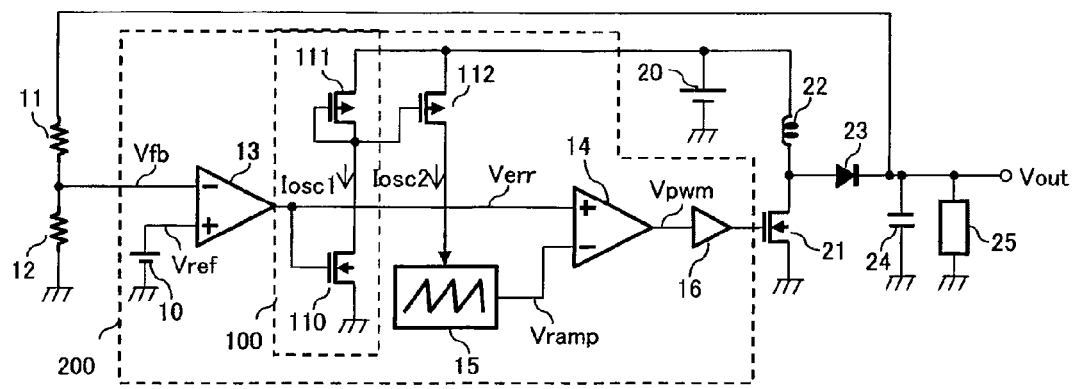
FIG. 4 is a circuit diagram of a conventional switching regulator.
Figure 5:
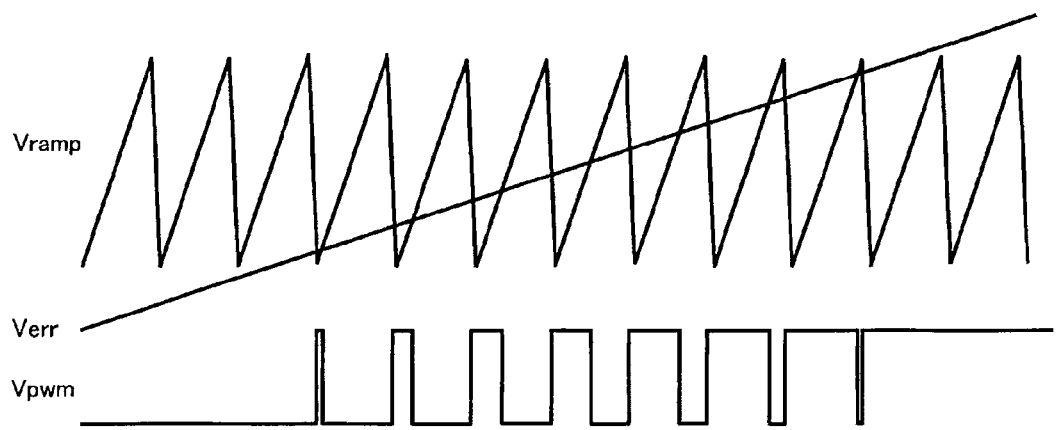
FIG. 5 illustrates an operational concept for a PWM operation by a conventional switching regulator.

FIG. 3 is a timing chart of the switching regulator of Embodiment 2. Let that the output from the error amplifier 13 is voltage Verr, constant current of the constant current source 123 is constant current Ic, voltage of the capacity 126 is voltage Vc and the output from the comparator 127 is an oscillation signal Vosc.

When the oscillation signal Vosc is at a L level, the charge/discharge control element 125 turns ON and the charge/discharge control element 124 turns OFF, and therefore the capacity 126 is charged with the constant current Ic. When the oscillation signal Vosc is at a L level, the multiplexer 128 outputs the reference voltage VH.

When the voltage Vc of the capacity 126 rises by charging to reach the reference voltage VH, the oscillation signal Vosc of the comparator 127 turns to a H level. As a result, the charge/discharge control element 125 turns OFF and the charge/discharge control element 124 turns ON, and therefore the capacity 126 starts discharging. At the same time, the output of the multiplexer 128 switches to the reference voltage VL. When the voltage Vc of the capacity 126 reaches the reference voltage VL, the output from the comparator 127 and the oscillation signal Vosc reverse. Such an operation is repeated, whereby the oscillation circuit 150 outputs the oscillation signal Vosc as a rectangular wave, thus controlling the switching element 21 via the buffer 16.

Herein, the driving ability of the charge/discharge control element 120 is controlled by the voltage Verr.

In the present embodiment, higher voltage Verr means higher driving ability of the charge/discharge control element 120. When the voltage Verr falls below threshold voltage Vth, the charge/discharge control element 120 turns OFF, so that current hardly flows. In this way, discharge time of the capacity 126 is controlled by the voltage Verr, that is, the oscillation frequency of the oscillation circuit 150 is controlled thereby. For instance, smaller load current Tout means higher divided voltage Vfb and lower voltage Verr. Accordingly, the driving ability of the charge/discharge control element 120 reduces or completely turns OFF, and so the discharging time of the capacity 126 becomes long and the oscillation frequency of the oscillation circuit 150 becomes low. On the other hand, larger load current Tout means lower divided voltage Vfb and higher voltage Verr. Accordingly the discharging time of the capacity 126 becomes short, and the oscillation frequency of the oscillation circuit 150 becomes high.

The ON duration ton of the switching element depends on the constant current Ic of the constant current source 123, the capacitance Cosc of the capacity 126, the reference voltage VH and the reference voltage VH as in the following Expression 1:

$$ton = Cosc \times (\text{reference voltage } VH - \text{reference voltage } VL)/Ic \quad (1).$$

Accordingly, the ON duration ton of the switching element is constant irrespective of a change of the oscillation frequency.

The maximum oscillation frequency fmax under heavy load is decided by the shortest discharging duration tdis (min) of the capacity 126 and the ON duration ton of the switching element as in the following Expression 2:

$$fmax = 1/(ton + tdis(min)) \quad (2).$$

FIG. 3 illustrates fmax duration.

As described above, in the switching regulator of Embodiment 2, the switching element 21 is driven at an optimum frequency in accordance with the load current Tout, and therefore the driving loss of the switching element 21 reduces. Especially boosting efficiency under light load can be improved.

Further since the oscillation signal VOSC output from the oscillation circuit 150 is a rectangular wave, a PWM comparator is not required. In general a PWM comparator has consumption current of a few uA to a few tens uA, which is an extremely large loss under light load where the output load current Tout is several uA. Accordingly such a configuration is considerably effective for the efficiency improvement under light load.

Even when the output voltage Vout is set low, the switching frequency is not fixed at a low state. Accordingly, ripple voltage of the output voltage Vout can be suppressed.

As described above, according to the switching regulators of the present invention, the oscillation circuit is controlled in accordance with the load current Tout, and therefore the oscillation frequency becomes low under light load and driving loss of the switching element 21 reduces, so that boosting efficiency can be improved. Further even when the output voltage Vout is set low, the switching frequency is not fixed at a low state. Accordingly, ripple voltage can be suppressed.

What is claimed is:

1. A switching regulator comprising:

an error amplifier that amplifies a difference between a divided voltage and a reference voltage, the divided voltage being obtained by dividing an output voltage, the divided voltage connected to an inverting input of the error amplifier, the error amplifier outputting an output signal comprising the amplified difference, wherein a magnitude of the output signal directly corresponds with changes in an output load current of the switching regulator;

an oscillation circuit that outputs a rectangular wave in accordance with an output signal from the error amplifier, the oscillation circuit including a constant current source that feeds constant current, a capacity that is charged with the constant current of the constant current source, a comparator that compares a voltage of the capacity with a bi-level reference voltage and outputs a rectangular wave, and a transistor circuit that controls charge/discharge current of the capacity in accordance with an output signal from the comparator and the output signal from the error amplifier, such that the charge/discharge current is proportional to a current of the transistor circuit; and a switching element, an ON/OFF state of the switching element being controlled by an output signal from the oscillation circuit, wherein an oscillation frequency of the oscillation circuit increases and decreases in direct correspondence with the output signal from the error amplifier and the output load current.

2. The switching regulator according to claim 1, wherein the oscillation circuit further includes a circuit that switches the bi-level reference voltage in accordance with the output signal from the comparator.

* * * * *